(12) United States Patent
Matsunaga et al.

(10) Patent No.: US 11,108,319 B2
(45) Date of Patent: Aug. 31, 2021

(54) POWER CONVERSION DEVICE WITH AN INTERMEDIATE CAPACITOR AND A SMOOTHING CAPACITOR

(71) Applicant: Mitsubishi Electric Corporation, Chiyoda-ku (JP)

(72) Inventors: Tatsuki Matsunaga, Chiyoda-ku (JP); Shuta Ishikawa, Chiyoda-ku (JP); Akihiko Iwata, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/646,841

(22) PCT Filed: May 10, 2018

(86) PCT No.: PCT/JP2018/018050
§ 371 (c)(1),
(2) Date: Mar. 12, 2020

(87) PCT Pub. No.: WO2019/097746
PCT Pub. Date: May 23, 2019

(65) Prior Publication Data
US 2020/0287458 A1    Sep. 10, 2020

(30) Foreign Application Priority Data
Nov. 16, 2017 (JP) .............................. JP2017-220633

(51) Int. Cl.
*H02M 3/07* (2006.01)
*H02M 1/08* (2006.01)
(Continued)

(52) U.S. Cl.
CPC ............... *H02M 3/07* (2013.01); *H02M 1/08* (2013.01); *H02M 1/32* (2013.01); *H02M 1/36* (2013.01); *H02M 3/1582* (2013.01)

(58) Field of Classification Search
CPC ........ H02M 3/07; H02M 3/1582; H02M 1/08; H02M 1/32; H02M 1/36; H02M 2001/007
See application file for complete search history.

(56) References Cited

U.S. PATENT DOCUMENTS

2008/0174280 A1   7/2008   Kazuno
2013/0021011 A1   1/2013   Okuda et al.
(Continued)

FOREIGN PATENT DOCUMENTS

EP   3 258 583 A1   12/2017
JP   60-87665 A     5/1985
(Continued)

OTHER PUBLICATIONS

International Search Report dated Jun. 12, 2018 in PCT/JP2018/018050 filed on May 10, 2018, 6 pages.
(Continued)

*Primary Examiner* — Kyle J Moody
*Assistant Examiner* — Jye-June Lee
(74) *Attorney, Agent, or Firm* — Xsensus LLP (57) ABSTRACT

The power conversion device includes: a boosting unit for boosting DC voltage, the boosting unit including a second switching element, a third switching element, a second reverse-current blocking element, and a third reverse-current blocking element which are connected in series, the boosting unit including an intermediate capacitor connected between a connection point between the second reverse-current blocking element and the third reverse-current blocking element, and a connection point between the third switching element and the second switching element; a smoothing capacitor which is connected in parallel to the boosting unit and smooths the DC voltage boosted by the boosting unit; and a control unit for turning on the third switching element (Continued)

so that the intermediate capacitor is charged to charge completion voltage of the intermediate capacitor.

13 Claims, 6 Drawing Sheets

(51) Int. Cl.
*H02M 1/32* (2007.01)
*H02M 3/158* (2006.01)
*H02M 1/36* (2007.01)

(56) References Cited

U.S. PATENT DOCUMENTS

| | | | |
|---|---|---|---|
| 2014/0266135 A1* | 9/2014 | Zhak | H02M 3/158 323/311 |
| 2015/0188362 A1* | 7/2015 | Mondal | H02M 3/156 307/52 |
| 2019/0334445 A1* | 10/2019 | Ishikawa | H02M 3/158 |
| 2020/0099300 A1* | 3/2020 | Ishikawa | H02M 3/1582 |

FOREIGN PATENT DOCUMENTS

| JP | 2005-45942 A | 2/2005 |
|---|---|---|
| JP | 2008-109844 A | 5/2008 |
| JP | 2014-64470 A | 4/2014 |
| JP | 2016-152729 A | 8/2016 |
| WO | WO 2011/092932 A1 | 8/2011 |
| WO | WO 2016/139734 A | 9/2016 |

OTHER PUBLICATIONS

Office Action dated Jun. 11, 2019, in corresponding to Japanese Application No. 2019-507885, 8 pages.
Office Action dated Nov. 5, 2019, in corresponding to Japanese Application No. 2019-507885, 11 pages.

* cited by examiner

MODE 5

MODE 6

FIG. 6

POWER CONVERSION DEVICE WITH AN INTERMEDIATE CAPACITOR AND A SMOOTHING CAPACITOR

TECHNICAL FIELD

The present invention relates to a power conversion device including a boosting circuit.

BACKGROUND ART

Among conventional power conversion devices, there is a power conversion device that boosts/steps down DC voltage by controlling the amounts of accumulation and release of magnetic energy of a reactor through ON/OFF operations of switching elements. Such a power conversion device that boosts/steps down DC voltage may have a configuration in which an intermediate capacitor is provided separately from a smoothing capacitor for smoothing output voltage, and DC voltage is boosted/stepped down using magnetic energy of the reactor and electrostatic energy of the intermediate capacitor in combination, thereby reducing the inductance value required for the reactor and thus downsizing the reactor.

In the case where the voltage difference between voltage charged in the intermediate capacitor and voltage charged in the smoothing capacitor is great, an element to which the voltage difference is applied is subjected to excessive voltage, so that the element might be broken. Technology for preventing the rated voltage of an element in the power conversion device from being exceeded at the time of initial charging is disclosed in Patent Document 1.

A DC/DC power conversion device in Patent Document 1 is a DC/DC power conversion device configured to boost inputted DC voltage and including two smoothing capacitors, one intermediate capacitor, two switching elements, two diodes, and an initial charging circuit connected between the negative side of the intermediate capacitor and the connection point between the two smoothing capacitors. The DC/DC power conversion device performs initial charging by causing current to flow to the intermediate capacitor and the smoothing capacitor by the initial charging circuit, so as to charge the intermediate capacitor at ½ of the voltage charged in the smoothing capacitor, thereby protecting the switching elements from overvoltage.

CITATION LIST

Patent Document

Patent Document 1: WO2011/092932

SUMMARY OF THE INVENTION

Problems to be Solved by the Invention

In the DC/DC power conversion device in Patent Document 1, the initial charging circuit is needed. Therefore, there is a problem that the number of components is increased and the circuit configuration is complicated. The present invention has been made to solve the above problem, and an object of the present invention is to obtain a power conversion device that does not need the initial charging circuit.

Solution to the Problems

A power conversion device according to the present invention includes: a boosting unit for boosting DC voltage, the boosting unit including a second switching element, a third switching element, a second reverse-current blocking element, and a third reverse-current blocking element which are connected in series, the boosting unit including an intermediate capacitor connected between a connection point between the second reverse-current blocking element and the third reverse-current blocking element, and a connection point between the third switching element and the second switching element; a smoothing capacitor which is connected in parallel to the boosting unit and smooths the DC voltage boosted by the boosting unit; an input terminal to which DC voltage is applied; a step-down unit which has a first switching element and a first reverse-current blocking element and steps down the DC voltage applied to the input terminal; a reactor provided between the step-down unit and the boosting unit and a control unit for controlling the boosting unit and the step-down unit, wherein the control unit turns on the third switching element in at least a partial period of a period from start of charging until the intermediate capacitor is charged to charge completion voltage of the intermediate capacitor, and the control unit repetitively turns on and off the first switching element in a period until the smoothing capacitor is charged to charge completion voltage of the smoothing capacitor.

Effect of the Invention

The power conversion device according to the present invention provides, owing to the above configuration, an effect of obtaining a power conversion device that does not need the initial charging circuit.

DESCRIPTION OF EMBODIMENTS

Embodiment 1

Hereinafter, the configuration and operation in the present embodiment will be described with reference to FIG. 1 to FIG. 3.

Figure 1:
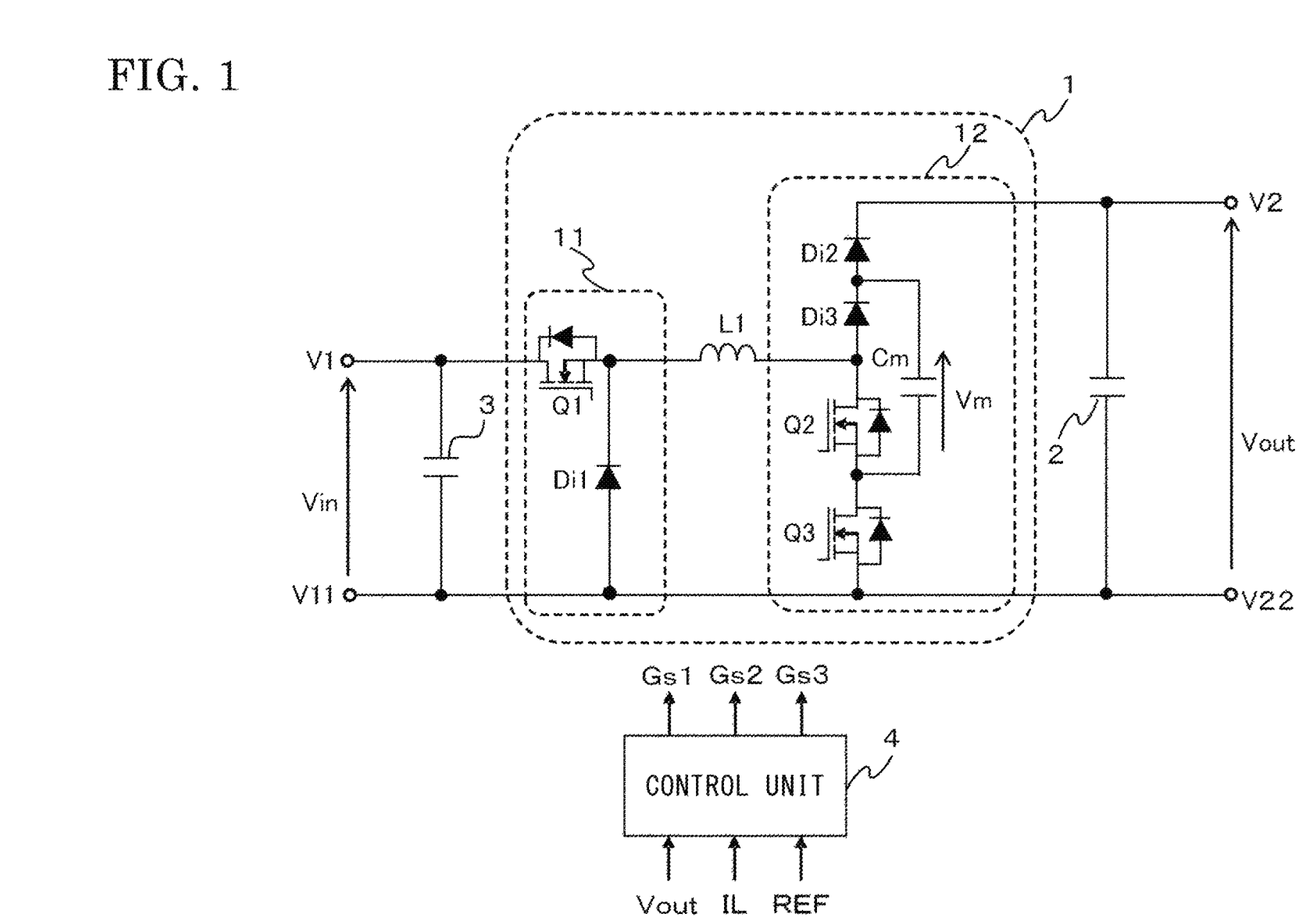
FIG. 1 is a circuit configuration diagram of a power conversion device according to embodiment 1 of the present invention.
Figure 2:
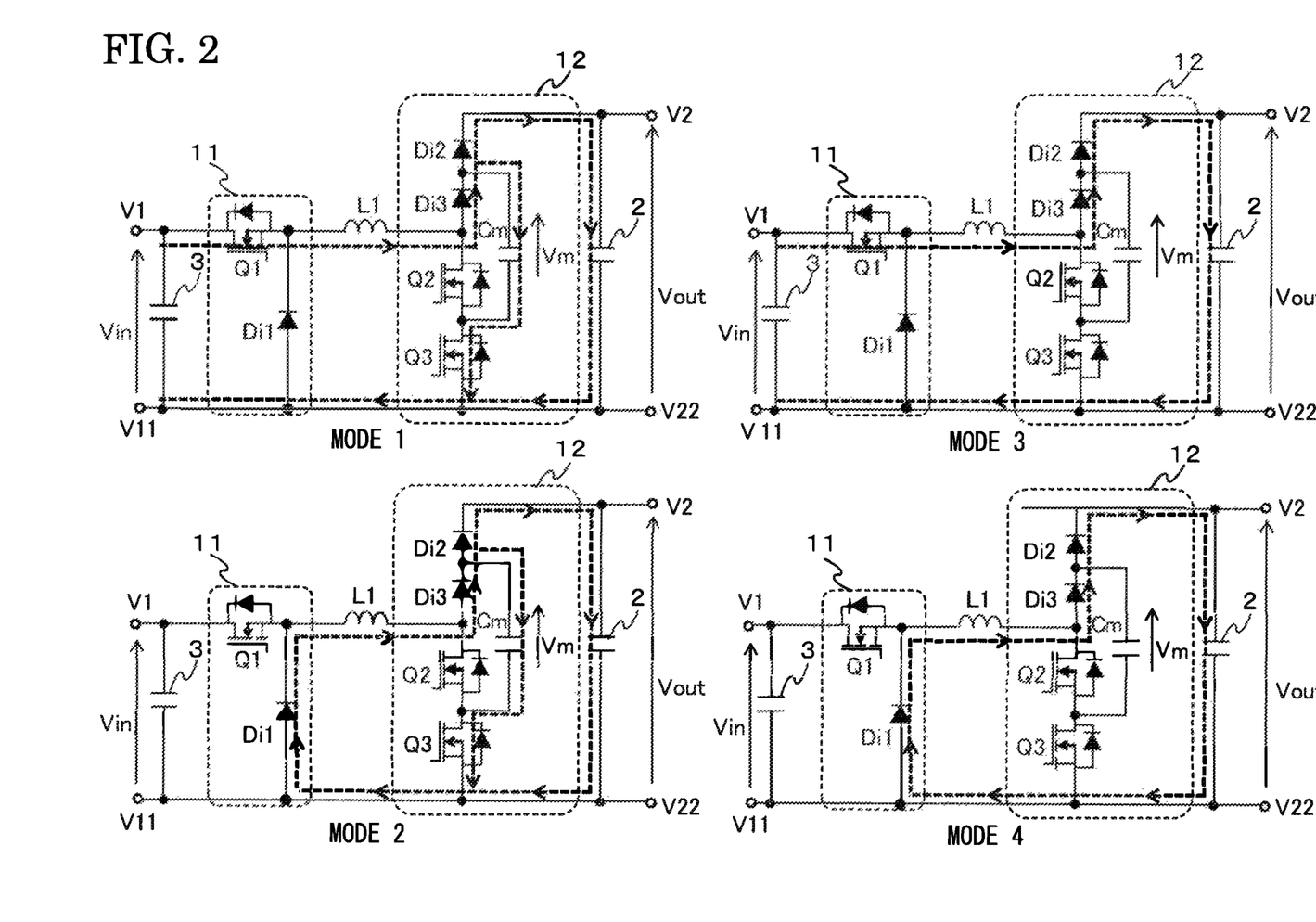
FIG. 2 illustrates operation modes in initial charging of the power conversion device according to embodiment 1 of the present invention.

FIG. 1 is a circuit configuration diagram of a power conversion device according to the present embodiment. In the present embodiment, a first switching element Q1, a second switching element Q2, and a third switching element Q3 are, for example, metal-oxide-semiconductor field-effect-transistors (MOSFET). However, the first switching element Q1, the second switching element Q2, and the third switching element Q3 are not limited to MOSFETs. For example, the first switching element Q1, the second switching element Q2, and the third switching element Q3 may be bipolar transistors or insulated gate bipolar transistors (IGBT).

In the present embodiment, a first reverse-current blocking element Di1, a second reverse-current blocking element Di2, and a third reverse-current blocking element Di3 are, for example, diodes. However, the first reverse-current blocking element Di1, the second reverse-current blocking element Di2, and the third reverse-current blocking element Di3 may be any elements that have functions equivalent to diodes. For example, the first reverse-current blocking element Di1, the second reverse-current blocking element Di2, and the third reverse-current blocking element Di3 may be body diodes formed by MOSFETs, flyback diodes formed by IGBTs, or the like.

The power conversion device according to the present embodiment boosts DC input voltage Vin inputted between an input terminal V1 and a first reference terminal V11 from a DC input power supply (not shown), to DC output voltage Vout equal to or greater than the DC input voltage Vin, or steps down the DC input voltage Vin to DC output voltage Vout equal to or smaller than the DC input voltage Vin, and outputs the DC output voltage Vout between an output terminal V2 and a second reference terminal V22.

The power conversion device according to the present embodiment includes a power conversion unit 1, a smoothing capacitor 2, an input capacitor 3, and a control unit 4. The power conversion unit 1 includes a step-down unit 11, a reactor L1, and a boosting unit 12.

The step-down unit 11 is a circuit composed of the first switching element Q1 and the first reverse-current blocking element Di1. The first switching element Q1 is connected in series between the input terminal V1 and the reactor L1. The drain terminal of the first switching element Q1 is connected to the input terminal V1. The source terminal of the first switching element 01 is connected to the reactor L1. When the first switching element Q1 is turned off, current from the DC input power supply to flow from the input terminal V1 to the reactor L1 is interrupted.

The first reverse-current blocking element Di1 is connected between the first reference terminal V11 and the connection point between the source terminal of the first switching element Q1 and the reactor L1. The cathode terminal of the first reverse-current blocking element Di1 is connected to the connection point between the first switching element Q1 and the reactor L1. The anode terminal of the first reverse-current blocking element Di1 is connected to the first reference terminal V11. The first reverse-current blocking element Di1 is used for causing current flowing through the reactor L1 to flow back by the first reverse-current blocking element Di1 being turned on when current from the DC input power supply is interrupted by the first switching element Q1.

The boosting unit 12 is a circuit composed of the second reverse-current blocking element Di2, the third reverse-current blocking element Di3, the second switching element Q2, the third switching element Q3, and an intermediate capacitor Cm. The second reverse-current blocking element Di2 and the third reverse-current blocking element Di3 are connected in series between the reactor L1 and the output terminal V2. The cathode terminal of the second reverse-current blocking element Di2 is connected to the output terminal V2. The anode terminal of the third reverse-current blocking element Di3 is connected to the reactor L1. The second reverse-current blocking element Di2 and the third reverse-current blocking element Di3 configured as described above allow current to flow from the reactor L1 to the smoothing capacitor 2, and block current from flowing from the smoothing capacitor 2 to the reactor L1.

The second switching element Q2 and the third switching element Q3 are connected in series between the first reference terminal V11 and the connection point between the reactor L1 and the third reverse-current blocking element Di3. Here, the drain terminal of the second switching element Q2 is connected to the connection point between the reactor L1 and the third reverse-current blocking element Di3. The source terminal of the third switching element Q3 is connected to the first reference terminal V11.

The intermediate capacitor Cm is connected between the connection point between the cathode terminal of the second reverse-current blocking element Di2 and the anode terminal of the third reverse-current blocking element Di3, and the connection point between the source terminal of the second switching element Q2 and the drain terminal of the third switching element Q3. The intermediate capacitor Cm is connected in parallel to the third reverse-current blocking element Di3 and the second switching element Q2.

The smoothing capacitor 2 is connected between the output terminal V2 and the second reference terminal V22. The smoothing capacitor 2 is for smoothing the DC voltage boosted by the boosting unit 12.

The input capacitor 3 is connected between the input terminal V1 and the first reference terminal V11. The input capacitor 3 is for smoothing the DC input voltage Vin.

The control unit 4 performs ON/OFF control for the first switching element Q1 of the step-down unit 11, and the second switching element Q2 and the third switching element Q3 of the boosting unit 12. The control unit 4 receives a current value IL of current flowing through the reactor L1, a current command value REF for causing current to flow through the reactor L1, and the output voltage value Vout of the output terminal V2. The control unit 4 outputs gate signals Gs1, Gs2, Gs3 for the switching elements Q1, Q2, Q3, respectively. The detailed operation of the control unit 4 will be described later. It is noted that, for each switching element Q1, Q2, Q3, in the case where the ON/OFF state is not specified, the switching element is assumed to be OFF. The control unit 4 may be formed by dedicated hardware such as ASIC, or may be formed by a microprocessor (CPU, MPU, MCU) and a memory (DRAM, SRAM, ROM, etc.) so as to operate in accordance with a program loaded in the memory, for example.

Next, operation in initial charging of the power conversion device according to the present embodiment will be described. FIG. 2 illustrates operation modes in initial charging of the power conversion device according to the present embodiment. It is noted that the period of initial charging is a period from the start of charging of the smoothing capacitor 2 and the intermediate capacitor Cm until the smoothing capacitor 2 and the intermediate capacitor Cm are charged to their respective charge completion voltages. In addition, the charge completion voltage of the smoothing capacitor 2 is Vcs [V], and the charge completion voltage of the intermediate capacitor Cm is Vcs/2 [V]. The voltage Vcs is, for example, voltage equal to the DC input voltage Vin. In the present embodiment, initial charging for the intermediate capacitor Cm and the smoothing capacitor 2 is performed using four operation modes, i.e., mode 1, mode 2, mode 3, and mode 4 shown in FIG. 2.

In mode 1, by the gate signals Gs1, Gs2, Gs3 outputted from the control unit 4, the first switching element Q1 is turned on, the second switching element Q2 is turned off, and the third switching element Q3 is turned on. Current in initial charging flows through the following two routes, so that the smoothing capacitor 2 and the intermediate capacitor Cm are charged at the same time.

Input terminal V1→first switching element Q1→reactor L1→third reverse-current blocking element Di3→second reverse-current blocking element Di2→smoothing capacitor 2→first reference terminal V11

Input terminal V1→first switching element Q1→reactor L1→third reverse-current blocking element Di3→intermediate capacitor Cm→third switching element Q3→first reference terminal V11

In mode 2, by the gate signals Gs1, Gs2, Gs3 outputted from the control unit 4, the first switching element Q1 is turned off, the second switching element Q2 is turned off, and the third switching element Q3 is turned on. Current in initial charging flows through the following two routes, so that the smoothing capacitor 2 and the intermediate capacitor Cm are charged at the same time.

Reactor L1→third reverse-current blocking element Di3→second reverse-current blocking element Di2→smoothing capacitor 2→first reverse-current blocking element Di1→reactor L1

Reactor L1→third reverse-current blocking element Di3→intermediate capacitor Cm→third switching element Q3→first reverse-current blocking element Di1→reactor L1

In mode 3, by the gate signals Gs1, Gs2, Gs3 outputted from the control unit 4, the first switching element Q1 is turned on, the second switching element Q2 is turned off, and the third switching element Q3 is turned off. Current in initial charging flows through the following route, so that only the smoothing capacitor 2 is charged.

Input terminal V1→first switching element Q1→reactor L1→third reverse-current blocking element Di3→second reverse-current blocking element Di2→smoothing capacitor 2→first reference terminal V11

In mode 4, by the gate signals Gs1, Gs2, Gs3 outputted from the control unit 4, the first switching element Q1 is turned off, the second switching element Q2 is turned off, and the third switching element Q3 is turned off. Current in initial charging flows through the following route, so that only the smoothing capacitor 2 is charged.

Reactor L1→third reverse-current blocking element Di3→second reverse-current blocking element Di2→smoothing capacitor 2→first reverse-current blocking element Di1→reactor L1

Next, protection from exceeding the rated current and the rated voltage of each element in the power conversion unit 1 will be described.

In mode 1, current flows from the input terminal V1 to the power conversion unit 1, and the smoothing capacitor 2 and the intermediate capacitor Cm are charged. In the case where the second reverse-current blocking element Di2, the third reverse-current blocking element Di3, and the third switching element Q3 are regarded as ideal elements of which the ON voltages are 0 [V], the circuit on the current route from the reactor L1 to the first reference terminal V11 can be regarded as a parallel circuit of the smoothing capacitor 2 and the intermediate capacitor Cm. Therefore, the DC output voltage Vout between the output terminal V2 and the second reference terminal V22 when the smoothing capacitor 2 is charged is equal to voltage Vm when the intermediate capacitor Cm is charged. Thus, voltage corresponding to the difference between the DC input voltage Vin and the DC output voltage Vout is applied to the reactor L1.

Where Vin is the DC input voltage, Vout is the DC output voltage, L is the inductance value of the reactor L1, and dt is an infinitesimal time, current in initial charging, i.e., reactor current IL flowing through the reactor L1 is calculated from voltage applied to the reactor L1 by the following Expression (1).

[Mathematical 1]

$$IL = \frac{1}{L}\int (Vin - Vout)dt \quad (1)$$

During initial charging, DC input voltage Vin>DC output voltage Vout is satisfied. Therefore, according to Expression (1), the reactor current IL increases over time. Therefore, as the initial charging in mode 1 continues, the rated currents of the second reverse-current blocking element Di2, the third reverse-current blocking element Di3, the first switching element Q1, and the third switching element Q3 through which the reactor current IL flows might be exceeded. In addition, when the reactor current IL increases, the charge voltages of the intermediate capacitor Cm and the smoothing capacitor 2 increase and thus the rated voltage of the third switching element Q3 might be exceeded.

On the other hand, when mode 1 is switched to mode 2, current from the input terminal V1 to the power conversion unit 1 is interrupted. At this time, voltage applied to the reactor L1 is equal to the DC output voltage Vout applied to the output terminal V2. Therefore, the reactor current IL is calculated by the following Expression (2).

[Mathematical 2]

$$IL = -\frac{1}{L}\int (Vout)dt \quad (2)$$

Accordingly, the reactor current IL that has increased in mode 1 decreases over time as shown by Expression (2).

As described above, in mode 1, the control unit 4 switches to mode 2 before the rated current of each of the second reverse-current blocking element Di2, the third reverse-current blocking element Di3, the first switching element Q1, and the third switching element Q3 on the current route and the rated voltage of the third switching element Q3 are exceeded. Thus, it is possible to perform initial charging while making protection from exceeding the rated current and the rated voltage of each element composing the power conversion unit 1.

It is desirable that the control unit 4 performs switching between mode 1 and mode 2 so that current flowing through the reactor L1 becomes constant. Specifically, for example, the control unit 4 may switch between mode 1 and mode 2 by using a control method such as PI control. In this case, the reactor current command value REF is set to such a value that cannot cause excess over the rated current, and the reactor current IL is fed back, whereby the above operation can be realized.

Here, mode 1 and mode 3 are different in that the ON/OFF state of the third switching element Q3 differs therebetween. In the case where the second reverse-current blocking element Di2, the third reverse-current blocking element Di3, and the third switching element Q3 are regarded as ideal elements of which the ON voltages are 0 [V], voltage applied to the reactor L1 is represented by the DC output voltage Vout charged in the smoothing capacitor 2 and the DC input voltage Vin. Therefore, the reactor current IL in mode 3 is calculated by Expression (1) as in mode 1.

Similarly, mode 2 and mode 4 are different in that the ON/OFF state of the third switching element Q3 differs therebetween, and then the reactor current IL in mode 4 is calculated by Expression (2) as in mode 2. As described above, the power conversion device according to the present embodiment performs ON/OFF control for the first switching element Q1, thereby performing initial charging while making protection from exceeding the rated current and the rated voltage of each element composing the power conversion unit 1.

In mode 3 and mode 4, in the case where the DC output voltage Vout charged into the smoothing capacitor 2 is the voltage Vcs [V] at the time of completion of the initial charging and the voltage Vm charged in the intermediate capacitor Cm is 0 [V], voltage applied to the second switching element Q2 is 0 [V] and voltage applied to the third switching element Q3 is the voltage Vcs charged in the smoothing capacitor 2. Therefore, if the rated voltage of the third switching element Q3 is smaller than Vcs [V], the rated voltage of the third switching element Q3 might be exceeded.

On the other hand, in mode 3 and mode 4, in the case where the smoothing capacitor 2 is charged at initial charging voltage Vcs [V] and the intermediate capacitor Cm is charged at initial charging voltage Vcs/2 [V], voltage applied to the second switching element Q2 is Vcs/2 [V], and voltage applied to the third switching element Q3 is Vcs/2 [V]. Thus, the voltages applied to the second switching element Q2 and the third switching element Q3 are equalized. In this way, in the present embodiment, initial charging is performed while making protection from exceeding the rated voltage of the third switching element Q3. That is, it is possible to use a switching element having a smaller rated voltage.

The operation of the power conversion unit 1 in initial charging will be described in detail with reference to FIG. 3.

Figure 3:
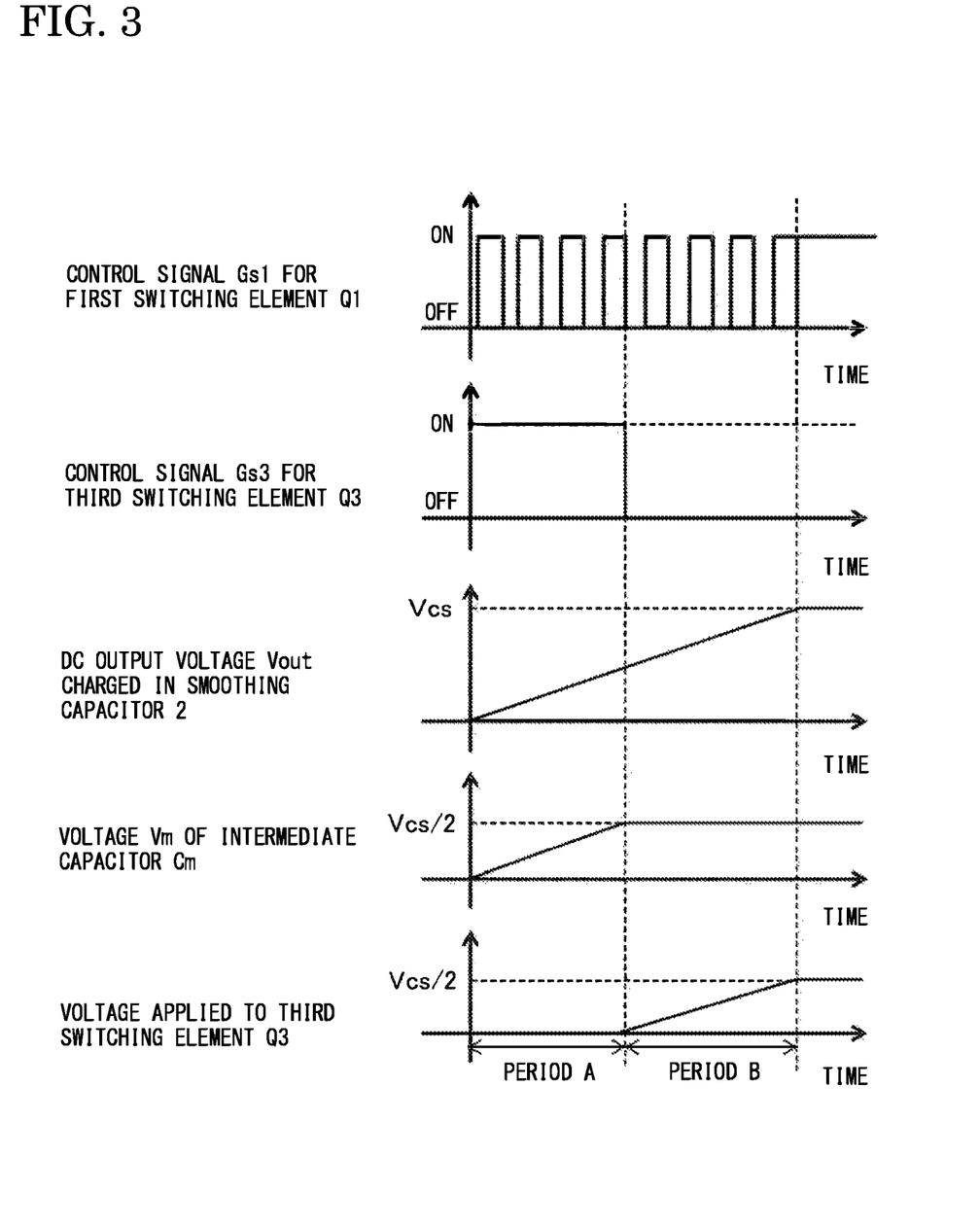
FIG. 3 is a timing chart in initial charging of the power conversion device according to embodiment 1 of the present invention.

FIG. 3 is a timing chart in initial charging of the power conversion unit 1 according to the present embodiment. According to FIG. 3, the control unit 4 repetitively turns on and off the first switching element Q1 so that excessive current does not flow through the reactor L1 as described above.

In the present embodiment, the initial charging period is separated into two types, i.e., period (A) and period (B). The period (A) is a period from the start of initial charging for the smoothing capacitor 2 and the intermediate capacitor Cm until completion of the initial charging for the intermediate capacitor Cm, i.e., a period until the voltage Vm of the intermediate capacitor Cm reaches the charge completion voltage Vcs/2 [V] through charging. In the period (A), the control unit 4 operates the power conversion unit 1 with mode 1 and mode 2.

In the period (A), since the control unit 4 turns on the third switching element Q3, current flows through the smoothing capacitor 2 and the intermediate capacitor Cm, and the DC output voltage Vout to be charged in the smoothing capacitor 2 and the voltage Vm of the intermediate capacitor Cm are equally charged. In addition, as described above, voltage applied to the drain terminal of the second switching element Q2 and the voltage Vm of the intermediate capacitor Cm are equal to each other. Therefore, when the DC output voltage Vout charged in the smoothing capacitor 2 has reached the charge completion voltage Vcs/2 [V], it can be determined that the voltage Vm of the intermediate capacitor Cm has reached the charge completion voltage Vcs/2 [V].

That is, the control unit 4 turns off the third switching element Q3 when the output voltage value Vout has reached the charge completion voltage Vcs/2 of the intermediate capacitor Cm.

Where C1 is the capacitance of the intermediate capacitor Cm, C2 is the capacitance of the smoothing capacitor 2, IL is reactor current flowing through the reactor L1, and dt is an infinitesimal time, the DC output voltage Vout in the period (A) is calculated from the following Expression (3).

[Mathematical 3]

$$Vout = \frac{1}{(C1+C2)} \int IL\, dt \quad (3)$$

Therefore, in the period (A), the DC output voltage Vout and the voltage Vm of the intermediate capacitor Cm gradually increase from 0 [V] over time, to reach the charge completion voltage Vcs/2 [V] of the intermediate capacitor Cm. That is, in the period (A), voltage applied to the second switching element Q2 gradually increases over time, to reach the charge completion voltage Vcs/2 [V] of the intermediate capacitor Cm. It is noted that, in the period (A), voltage applied between the source terminal and the drain terminal of the third switching element Q3 is 0 [V].

The period (B) is a period from completion of the initial charging for the intermediate capacitor Cm until completion of the initial charging for the smoothing capacitor 2, i.e., a period until the DC output voltage Vout reaches the charge completion voltage Vcs [V] through charging. In the period (B), the control unit 4 operates the power conversion unit 1 with mode 3 and mode 4.

In the period (B), the control unit 4 switches the third switching element Q3 from ON to OFF. As a result, charging for the intermediate capacitor Cm is stopped, and therefore the voltage Vm of the intermediate capacitor Cm becomes constant at Vcs/2 [V]. In addition, voltage of the second switching element Q2 connected in parallel to the intermediate capacitor Cm becomes constant at Vcs/2 [V]. In the period (B), only the smoothing capacitor 2 is charged. Here, voltage corresponding to the difference between the DC output voltage Vout charged into the smoothing capacitor and the voltage Vm of the intermediate capacitor Cm is applied between the source terminal and the drain terminal of the third switching element Q3.

Where the voltage charged in the period (A) is Vcs/2 [V], C2 is the capacitance of the smoothing capacitor 2, IL is current flowing through the reactor L1, and dt is an infinitesimal time, the DC output voltage Vout charged into the smoothing capacitor 2 in the period (B) is calculated by the following Expression (4).

[Mathematical 4]

$$Vout = \frac{Vcs}{2} + \frac{1}{(C2)} \int IL\, dt \quad (4)$$

Therefore, the DC output voltage Vout charged into the smoothing capacitor 2 gradually increases from Vcs/2 [V] over time, to reach the charge completion voltage Vcs [V] of the smoothing capacitor 2. That is, voltage applied to the third switching element Q3 in the period (B) gradually increases over time, to reach Vcs/2 [V].

Therefore, when the period (B) is ended, i.e., when the DC output voltage Vout charged in the smoothing capacitor 2 has reached the charge completion voltage Vcs [V] of the smoothing capacitor 2, voltages applied to the second switching element Q2 and the third switching element Q3 are each Vcs/2 [V].

As described above, in the present embodiment, the period (A) in which the smoothing capacitor 2 and the intermediate capacitor Cm are charged at the same time, and the period (B) in which only the smoothing capacitor 2 is charged after completion of the initial charging for the intermediate capacitor Cm, are provided, thereby providing an effect of obtaining the power conversion device that includes the step-down unit 11, the boosting unit 12 including the intermediate capacitor Cm, and the smoothing capacitor 2 and that does not require an initial charging circuit.

Further, the control unit 4 turns on and off the third switching element Q3 so that the smoothing capacitor 2 and the intermediate capacitor Cm are charged at the same time, whereby, in initial charging, the charge voltage difference between the smoothing capacitor 2 and the intermediate capacitor Cm becomes small. Therefore, a further effect of obtaining a power conversion device that is capable of performing initial charging while protecting the third switching element Q3 from exceeding the rated voltage, is provided. That is, a further effect of allowing a switching element having a smaller rated voltage to be used in the power conversion device, is provided.

Further, the control unit 4 switches the first switching element Q1 from ON to OFF before the reactor current IL flowing through the reactor L1 exceeds the rated currents of the first switching element 01, the third switching element Q3, the second reverse-current blocking element Di2, and the third reverse-current blocking element Di3, thereby providing a further effect of enabling initial charging while making protection from exceeding the rated currents of the first switching element Q1, the third switching element Q3, the second reverse-current blocking element Di2, and the third reverse-current blocking element Di3 and the rated voltage of the third switching element Q3.

In the present embodiment, the first switching element Q1 is connected between the input terminal V1 and the reactor L1. However, the first switching element Q1 may be connected between the first reference terminal V11 and the connection point between the first reference terminal V11 and the anode terminal of the first reverse-current blocking element Di1.

In the present embodiment, the step-down unit 11 and the boosting unit 12 do not have reactors. However, as a matter of course, the step-down unit 11 and the boosting unit 12 may each have a reactor connected in series to the reactor L1, whereby the same effect can be obtained.

In the present embodiment, relative to the charge completion voltage Vcs [V] of the smoothing capacitor 2, the charge completion voltage of the intermediate capacitor Cm is set to Vcs/2 [V], but is not limited thereto. The charge completion voltage of the intermediate capacitor Cm may be optionally set as long as the charge completion voltage does not exceed the rated voltages of the second switching element Q2 and the third switching element Q3.

In the present embodiment, the control unit 4 turns on the third switching element Q3 during the period (A) in which the smoothing capacitor 2 and the intermediate capacitor Cm are charged. However, the control unit 4 does not necessarily have to continue turning on the third switching element Q3 during the period (A), and a period in which the third switching element Q3 is turned off may be included in the period (A). Also in this case, the charge voltage difference between the smoothing capacitor 2 and the intermediate capacitor Cm becomes small. That is, an effect of obtaining a power conversion device capable of initial charging for the smoothing capacitor and the intermediate capacitor with a simplified configuration without the need of an initial charging circuit, is equally provided. In addition, a further effect of allowing a switching element having a smaller rated voltage to be used in the power conversion device, is also equally provided.

In the present embodiment, the step-down unit 11 prevents inrush current at the time of initial charging, thereby providing an effect of preventing excess over the rated voltage of the third switching element Q3. However, an element (for example, inrush resistor) for preventing inrush current may be provided in place of the step-down unit 11 in the present embodiment. Also in this case, the control unit 4 turns on the third switching element Q3 so that the intermediate capacitor Cm is charged to the charge completion voltage of the intermediate capacitor Cm, whereby the charge voltage difference between the smoothing capacitor 2 and the intermediate capacitor Cm becomes small. That is, an effect of obtaining a power conversion device capable of initial charging for the smoothing capacitor and the intermediate capacitor with a simplified configuration without the need of an initial charging circuit, is equally provided. In addition, a further effect of allowing a switching element having a smaller rated voltage to be used in the power conversion device, is also equally provided.

Embodiment 2

Figure 4:
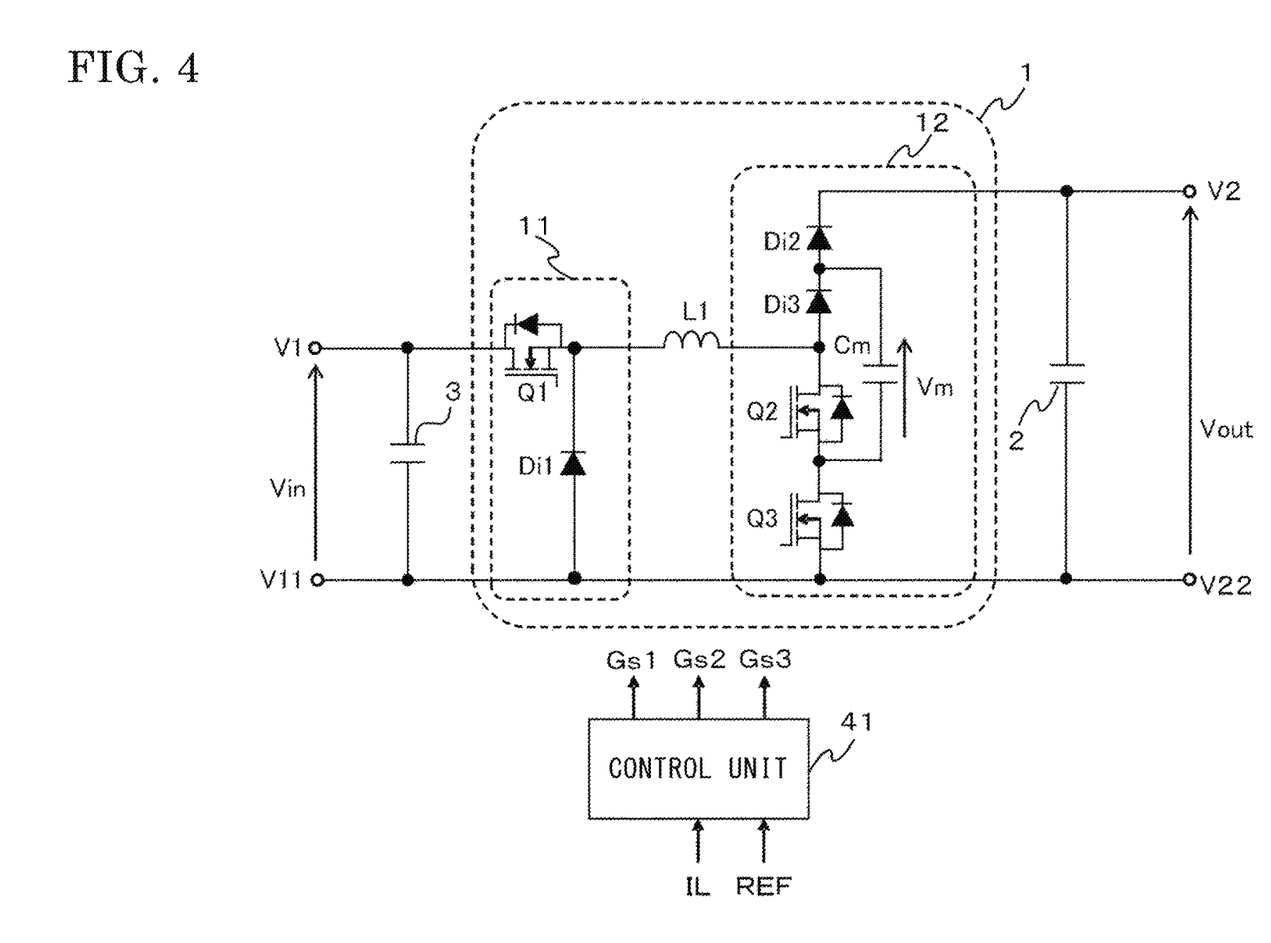
FIG. 4 is a circuit configuration diagram of a power conversion device according to embodiment 2 of the present invention.

In the present embodiment, an example in which initial charging is performed without providing the period (A) and the period (B) described in embodiment 1, will be described. Hereinafter, the configuration and operation in the present embodiment will be described with reference to FIG. 4 to FIG. 6. FIG. 4 is a circuit configuration diagram of a power conversion device according to the present embodiment. The circuit configuration of the power conversion device according to the present embodiment is the same as that of the power conversion device according to embodiment 1 except that the control unit 4 in FIG. 1 in embodiment 1 is replaced with a control unit 41, and therefore the description thereof is omitted. Unlike the control unit 4 in embodiment 1, the control unit 41 does not use a terminal to which the DC output voltage Vout of the output terminal V2 is inputted. The operation of the control unit 41 will be described later.

In the present embodiment, the control unit 41 performs ON/OFF control for the first switching element Q1 and the third switching element Q3 so that the voltage Vm charged into the intermediate capacitor Cm becomes voltage (e.g., Vout/2) not greater than the DC output voltage Vout charged into the smoothing capacitor 2 over the entire period in which initial charging is performed for the intermediate capacitor Cm and the smoothing capacitor 2.

The voltage Vm charged into the intermediate capacitor Cm is Vout/2 relative to the DC output voltage Vout charged into the smoothing capacitor 2, and thus voltage applied between the source terminal and the drain terminal of the second switching element Q2 and voltage applied between the source terminal and the drain terminal of the third switching element Q3 are equalized. This is the same as described in embodiment 1.

Figure 5:
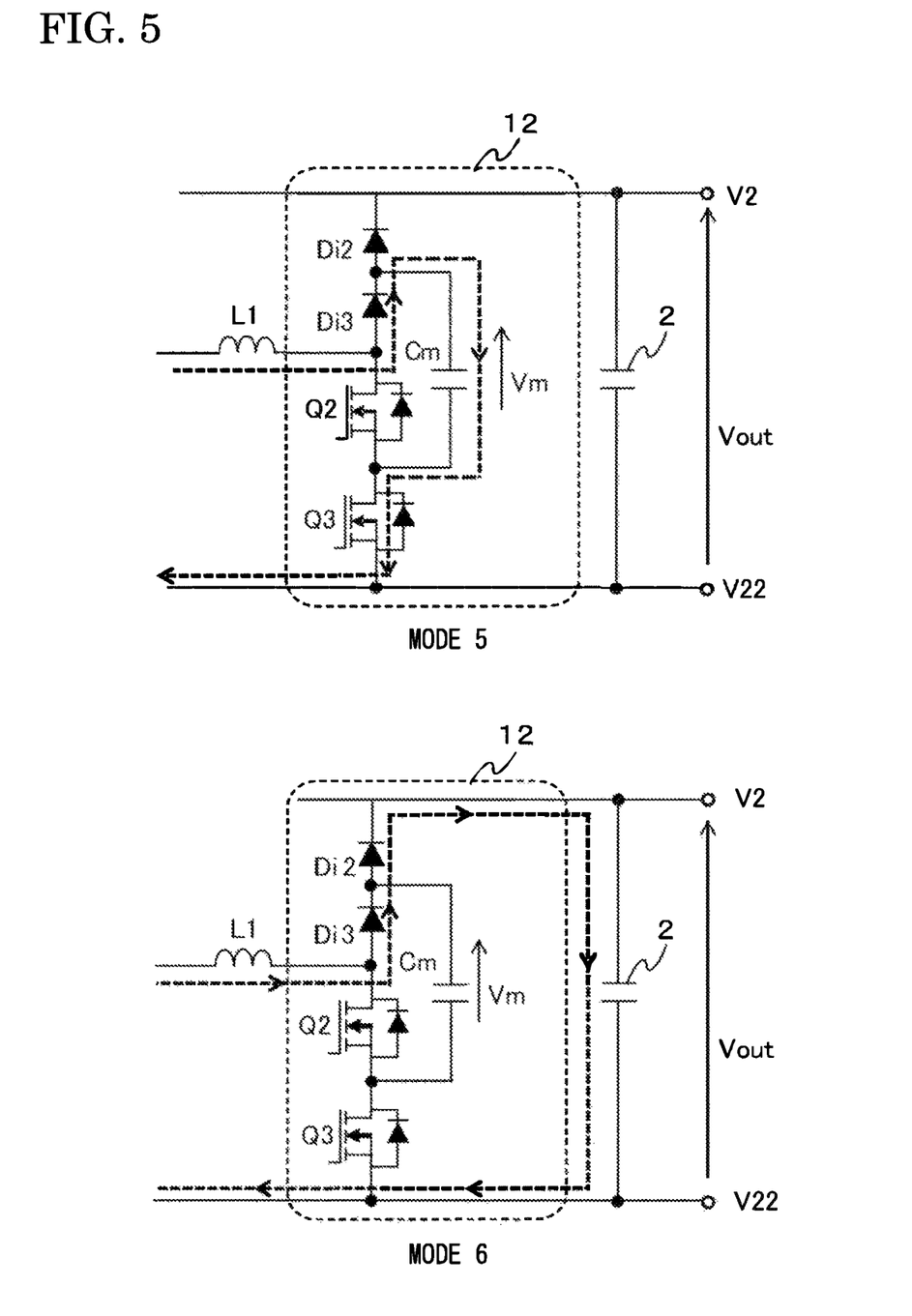
FIG. 5 illustrates operation modes in initial charging of the power conversion device according to embodiment 2 of the present invention.

FIG. 5 illustrates operation modes of the boosting unit 12 in the power conversion device according to the present embodiment. As shown in FIG. 5, in the present embodiment 2, initial charging for the intermediate capacitor Cm and the smoothing capacitor 2 is performed with two modes, i.e., mode 5 and mode 6, based on combination of the ON/OFF states of the second switching element Q2 and the third switching element Q3 provided in the boosting unit 12. The control unit 41 turns on/off the first switching element Q1 and the third switching element Q3 provided in the step-down unit 11 at respective timings independent of each other. The current IL flowing through the reactor L1 at each of the time when the first switching element Q1 is ON and the time when the first switching element Q1 is OFF is the same as in embodiment 1. Therefore, the description thereof is omitted.

In mode 5, by the gate signals Gs2 and Gs3 outputted from the control unit 41, the second switching element Q2 is turned off and the third switching element Q3 is turned on. The current in initial charging passes through the reactor L1, the third reverse-current blocking element Di3, the intermediate capacitor Cm, and then the third switching element Q3, and thereafter, the current returns to the input side. The current in initial charging flows through the following route, so that the intermediate capacitor Cm is charged.

Reactor L1→third reverse-current blocking element Di3→intermediate capacitor Cm→third switching element Q3

Mode 5 is the same as mode 1 and mode 2 in embodiment 1 in that the second switching element Q2 is turned off and the third switching element Q3 is turned on. Meanwhile, mode 5 is different from mode 1 and mode 2 in that the voltage Vm charged into the intermediate capacitor Cm is lower than the DC output voltage Vout charged into the smoothing capacitor 2 and therefore current flows through only the intermediate capacitor.

In mode 6, by the gate signals Gs2 and Gs3 outputted from the control unit 41, the second switching element Q2 is turned off and the third switching element Q3 is turned off. Current in initial charging flows through the following route, so that the smoothing capacitor 2 is charged.

Reactor L1→third reverse-current blocking element Di3→second reverse-current blocking element Di2→smoothing capacitor 2

As described above, the period in which the intermediate capacitor Cm is charged is provided in mode 5, and the period in which the smoothing capacitor is charged is provided in mode 6, thereby performing initial charging for the intermediate capacitor Cm to Vout/2 [V] and performing initial charging for the smoothing capacitor 2 to Vout.

The control unit 41 switches on/off the third switching element Q3, thereby switching between mode 5 and mode 6. In this case, instead of using the output voltage value Vout as described in embodiment 1, the control unit 41 stores, in advance, a time ratio between the time for performing initial charging in mode 5 and the time for performing initial charging in mode 6 as calculated by a method described below, and repetitively turns on and off the third switching element Q3 at the time ratio by pulse width modulation (PWM), thereby realizing the switching.

Next, the method for calculating the time ratio between the time for performing initial charging in mode 5 and the time for performing initial charging in mode 6 will be described. Here, current for charging the intermediate capacitor Cm in mode 5 is denoted by I1, and current for charging the smoothing capacitor 2 in mode 6 is denoted by I2. In addition, the time ratio between the time for performing initial charging in mode 5 and the time for performing charging in mode 6, i.e., the time ratio of the time during which the third switching element Q3 is turned on relative to the time during which the third switching element Q3 is turned off, is defined as ON duty D, and reactor current flowing through the reactor L1 is denoted by IL. Then, the current I1 for charging the intermediate capacitor Cm is calculated by the following Expression (5), and the current I2 for charging the smoothing capacitor is calculated by the following Expression (6). In Expression (6), (1−D) represents the time ratio (OFF duty) of the time during which the third switching element Q3 is turned off relative to the time during which the third switching element Q3 is turned on.

[Mathematical 5]

$$I1 = D \cdot IL \quad (5)$$

[Mathematical 6]

$$I2 = (1-D) \cdot IL \quad (6)$$

Next, the voltage Vm charged into the intermediate capacitor Cm is calculated by the following Expression (7), using the capacitance C1 of the intermediate capacitor Cm, the infinitesimal time dt, and the above Expression (5), and the DC output voltage Vout charged into the smoothing capacitor 2 is calculated by the following Expression (8), using the capacitance C2 of the smoothing capacitor 2, the infinitesimal time dt, and the above Expression (6).

[Mathematical 7]

$$Vm = \frac{1}{C1} \int (D \cdot IL) dt \quad (7)$$

[Mathematical 8]

$$Vout = \frac{1}{C2} \int \{(1-D) \cdot IL\} dt \quad (8)$$

The voltage Vm charged into the intermediate capacitor Cm is controlled to be Vout/2 relative to the DC output voltage Vout charged into the smoothing capacitor 2. Therefore, from Expression (7) and Expression (8), the following Expression (9) is obtained.

[Mathematical 9]

$$\frac{IL}{C1} \int D \cdot dt = \frac{1}{2} \cdot \frac{IL}{C2} \int (1-D) \cdot dt \quad (9)$$

In Expression (9), the ON duty D of the third switching element Q3 is integrated with respect to time, thereby obtaining the time for charging the intermediate capacitor Cm in mode 5, i.e., the ON duty D for performing pulse width modulation for the third switching element Q3. Similarly, the OFF duty (1−D) of the third switching element Q3 is integrated with respect to time, thereby obtaining the time for charging the smoothing capacitor 2 in mode 6, i.e., the OFF duty (1−D) in pulse width modulation for the third switching element Q3.

In Expression (9), the ON duty in pulse width modulation for the third switching element Q3 is replaced with Dm, and the OFF duty in pulse width modulation for the third switching element Q3 is replaced with (1−Dm), and then the expression is arranged, thereby obtaining the following Expression (10).

[Mathematical 10]

$$\frac{Dm}{C1} = \frac{1}{2} \cdot \frac{(1-Dm)}{C2} \quad (10)$$

By arranging Expression (10) for the ON duty Dm of the third switching element Q3, the following Expression (11) is obtained.

[Mathematical 11]

$$Dm = \frac{1}{2 \cdot \frac{C2}{C1} + 1} \quad (11)$$

By Expression (11), the ON duty Dm of the third switching element Q3 is determined in accordance with the capacitance ratio between the capacitance C1 of the intermediate capacitor Cm and the capacitance C2 of the smoothing capacitor 2, and pulse width modulation (PWM) is performed with the calculated ON duty Dm over the entire period in which initial charging is performed, thereby performing ON/OFF control for the third switching element Q3. Thus, the voltage Vm charged into the intermediate capacitor Cm is controlled to be Vout/2 relative to the DC output voltage Vout charged into the smoothing capacitor 2.

Figure 6:
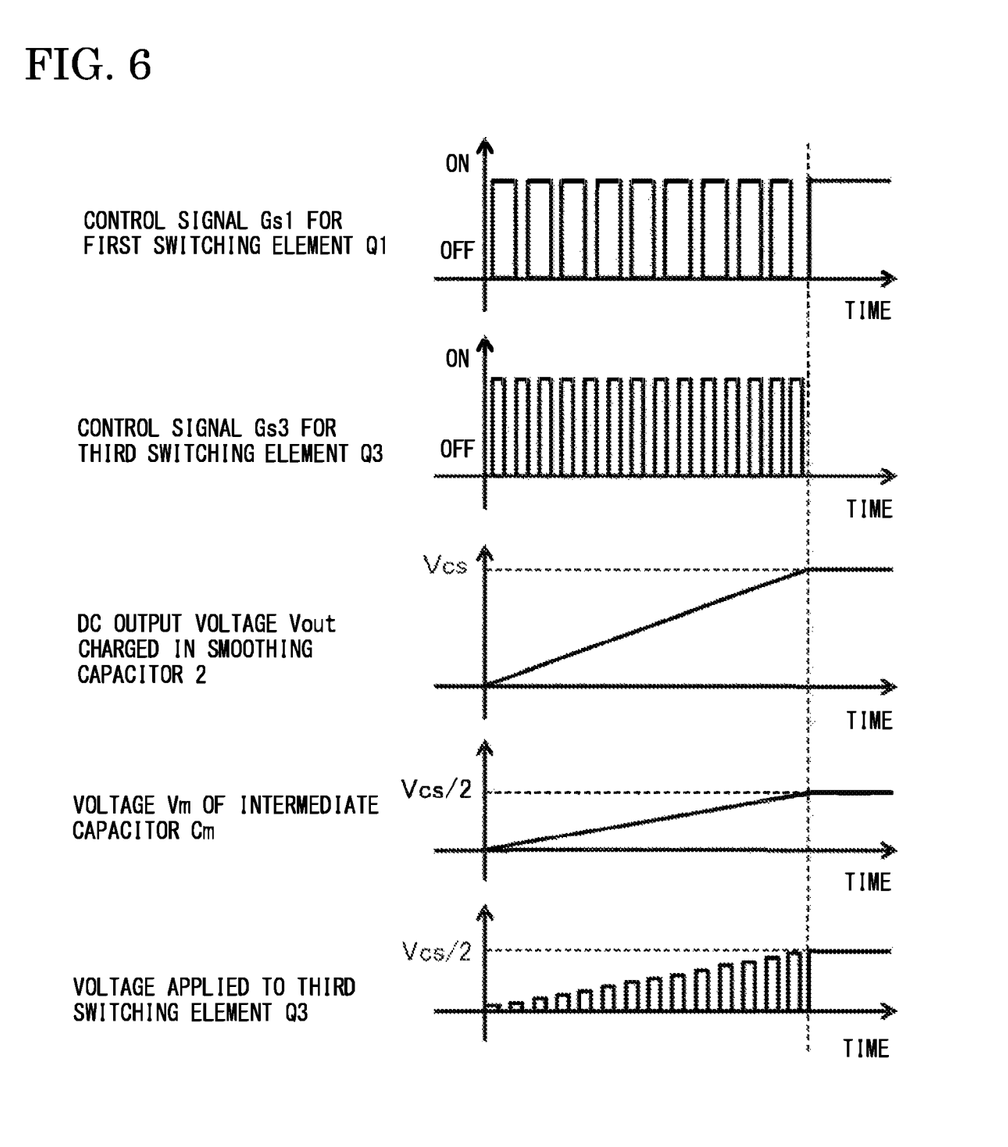
FIG. 6 is a timing chart in initial charging of the power conversion device according to embodiment 2 of the present invention.

FIG. 6 is a timing chart in initial charging of the power conversion unit 1 according to the present embodiment 2. According to FIG. 6, as in embodiment 1, the control unit 41 repetitively turns on and off the first switching element Q1 so that excessive current does not flow through the reactor L1. In addition, the control unit 41 repetitively turns on and off the third switching element Q3 with the ON duty Dm that satisfies Expression (11).

Thus, over the entire period in which initial charging is performed, the voltage Vm charged into the intermediate capacitor Cm is controlled to be Vout/2 relative to the DC output voltage Vout charged into the smoothing capacitor 2, in accordance with Expression (7) and Expression (8). Therefore, it is not necessary to provide the period (A) in which the smoothing capacitor 2 and the intermediate capacitor Cm are charged at the same time, and the period (B) in which only the smoothing capacitor 2 is charged after completion of initial charging for the intermediate capacitor Cm. In addition, at a timing when the third switching element Q3 is turned off, voltage charged in the intermediate capacitor Cm is applied to the third switching element Q3.

As described above, as in embodiment 1, the present embodiment also provides an effect of obtaining the power conversion device that includes the step-down unit 11, the boosting unit 12 including the intermediate capacitor Cm, and the smoothing capacitor 2 and that is capable of performing initial charging for the smoothing capacitor 2 and the intermediate capacitor Cm with a simplified configuration, without the need of an initial charging circuit.

Further, also in the present embodiment, as in embodiment 1, the control unit 41 turns on and off the third switching element Q3 so as to charge the smoothing capacitor 2 and the intermediate capacitor Cm in parallel, whereby, in initial charging, the charge voltage difference between the smoothing capacitor 2 and the intermediate capacitor Cm becomes small. Therefore, a further effect of obtaining a power conversion device that is capable of performing initial charging while protecting the third switching element Q3 from exceeding the rated voltage, is provided. That is, a further effect of allowing a switching element having a smaller rated voltage to be used in the power conversion device, is provided.

Further, also in the present embodiment, as in embodiment 1, the control unit 41 switches the first switching element Q1 from ON to OFF before the reactor current IL flowing through the reactor L1 exceeds the rated currents of the first switching element Q1, the third switching element Q3, the second reverse-current blocking element Di2, and the third reverse-current blocking element Di3, thereby providing a further effect of enabling initial charging while making protection from exceeding the rated currents of the first switching element Q01, the third switching element Q3, the second reverse-current blocking element Di2, and the third reverse-current blocking element Di3 and the rated voltage of the third switching element Q3.

In addition, in the present embodiment, the control unit 41 turns on and off the third switching element Q3 on the basis of the ON duty Dm calculated from the respective capacitances C1, C2 of the intermediate capacitor Cm and the smoothing capacitor 2. Therefore, it is not necessary to determine whether initial charging for the intermediate capacitor Cm is completed on the basis of the DC output voltage Vout as in embodiment 1. Thus, the present embodiment provides a further effect of enabling initial charging while protecting the third switching element Q3 of the boosting unit 12 from exceeding the rated voltage, with simpler processing than in embodiment 1.

In the present embodiment, relative to the charge completion voltage Vcs [V] of the smoothing capacitor 2, the charge completion voltage of the intermediate capacitor Cm is set to Vcs/2 [V], but is not limited thereto. The charge completion voltage of the intermediate capacitor Cm may be optionally set as long as the charge completion voltage does not exceed the rated voltages of the second switching element Q2 and the third switching element Q3.

In the case of controlling the charge completion voltage of the intermediate capacitor Cm to be 1/X [V] relative to the charge completion voltage Vcs [V] of the smoothing capacitor 2, the ON duty Dm of the third switching element Q3 is obtained by the following Expression (12).

[Mathematical 12]

$$Dm = \frac{1}{X \cdot \frac{C2}{C1} + 1} \quad (12)$$

The present invention is not limited to embodiments 1 and 2. Within the technical scope of the present invention, the above embodiments may be partially modified or simplified, for example.

INDUSTRIAL APPLICABILITY

The present invention is applicable to a power conversion device having a boosting circuit.

DESCRIPTION OF THE REFERENCE CHARACTERS 1 power conversion unit
2 smoothing capacitor
3 input capacitor
4 control unit
41 control unit 11 step-down unit
12 boosting unit
V1 input terminal
V2 output terminal
V11 first reference terminal
V22 second reference terminal
L1 reactor
Q1 first switching element
Q2 second switching element
Q3 third switching element
Di1 first reverse-current blocking element
Di2 second reverse-current blocking element
Di3 third reverse-current blocking element
Cm intermediate capacitor

The invention claimed is:

1. A power conversion device comprising:
an input terminal to which a DC voltage is applied;
a step-down device which has a first switching element and a first reverse-current blocking element and steps down the DC voltage applied to the input terminal;
a booster to boost DC voltage, the booster including a second switching element, a third switching element, a second reverse-current blocking element, and a third reverse-current blocking element which are connected in series, the booster including an intermediate capacitor connected between a connection point between the second reverse-current blocking element and the third reverse-current blocking element, and a connection point between the third switching element and the second switching element;
a smoothing capacitor which is connected in parallel to the booster and smooths the DC voltage boosted by the booster;
a reactor provided between the step-down device and the booster; and
a controller to control the booster and the step-down device, wherein
the controller turns on the third switching element in at least a partial period of a period from start of charging until the intermediate capacitor is charged to a charge completion voltage of the intermediate capacitor, and the controller repetitively turns on and off the first switching element in a period until the smoothing capacitor is charged to a charge completion voltage of the smoothing capacitor.

2. The power conversion device according to claim 1, wherein
the controller turns off the third switching element until the smoothing capacitor is charged to the charge completion voltage of the smoothing capacitor after the intermediate capacitor is charged to the charge completion voltage of the intermediate capacitor.

3. The power conversion device according to claim 2, wherein
the controller turns off the first switching element so that current flows back to the reactor and the first reverse-current blocking element.

4. The power conversion device according to claim 1, wherein
the controller repetitively turns on and off the third switching element on a basis of an ON duty determined from capacitances of the intermediate capacitor and the smoothing capacitor, until the intermediate capacitor and the smoothing capacitor are charged to the respective charge completion voltages.

5. The power conversion device according to claim 4, wherein
the ON duty Dm is a value calculated by the following expression:

$$Dm = \frac{1}{X \cdot \frac{C2}{C1} + 1}$$

where C1 is the capacitance of the intermediate capacitor, C2 is the capacitance of the smoothing capacitor, and the charge completion voltage of the intermediate capacitor is 1/X of the charge completion voltage of the smoothing capacitor.

6. The power conversion device according to claim 1, wherein
in a period until the smoothing capacitor and the intermediate capacitor are charged to the respective charge completion voltages, the control unit repetitively turns on and off the first switching element so that current flowing through the reactor does not exceed a predetermined current command value.

7. The power conversion device according to claim 6, wherein
the predetermined current command value is a rated current of any of the second switching element, the third switching element, the second reverse-current blocking element, and the third reverse-current blocking element included in the booster.

8. The power conversion device according to claim 6, further comprising:
a first reference terminal;
an output terminal to which the DC voltage boosted by the booster is outputted; and
a second reference terminal, wherein
the first reverse-current blocking element is connected between the reactor and the first reference terminal,
the first switching element is connected between the input terminal and the reactor, or between the first reference terminal and the first reverse-current blocking element,
the third reverse-current blocking element and the second reverse-current blocking element are connected in series between the reactor and the output terminal, and
the second switching element and the third switching element are connected in series between the reactor and the second reference terminal.

9. The power conversion device according to claim 1, further comprising:
a first reference terminal;
an output terminal to which the DC voltage boosted by the booster is outputted; and
a second reference terminal, wherein
the first reverse-current blocking element is connected between the reactor and the first reference terminal,
the first switching element is connected between the input terminal and the reactor, or between the first reference terminal and the first reverse-current blocking element,
the third reverse-current blocking element and the second reverse-current blocking element are connected in series between the reactor and the output terminal, and
the second switching element and the third switching element are connected in series between the reactor and the second reference terminal.

10. The power conversion device according to claim 1, wherein
the first reverse-current blocking element is a diode.

11. The power conversion device according to claim 1, wherein
the second reverse-current blocking element and the third reverse-current blocking element are diodes.

12. The power conversion device according to claim 1, wherein
the controller turns off the first switching element so that current flows back to the reactor and the first reverse-current blocking element.

13. The power conversion device according to claim 1, wherein
in a period from start of charging until the smoothing capacitor is charged to the charge completion voltage of the smoothing capacitor, the controller controls the booster and the step-down device, using:

a first mode in which the first switching element is turned on, the second switching element is turned off, and the third switching element is turned on, to charge the smoothing capacitor and the intermediate capacitor;

a second mode in which the first switching element is turned off, the second switching element is turned off, and the third switching element is turned on, to charge the smoothing capacitor and the intermediate capacitor;

a third mode in which the first switching element is turned on, the second switching element is turned off, and the third switching element is turned off, to charge the smoothing capacitor; and a fourth mode in which the first switching element is turned off, the second switching element is turned off, and the third switching element is turned off, to charge the smoothing capacitor.

\* \* \* \* \*